United States Patent Office 3,441,400
Patented Apr. 29, 1969

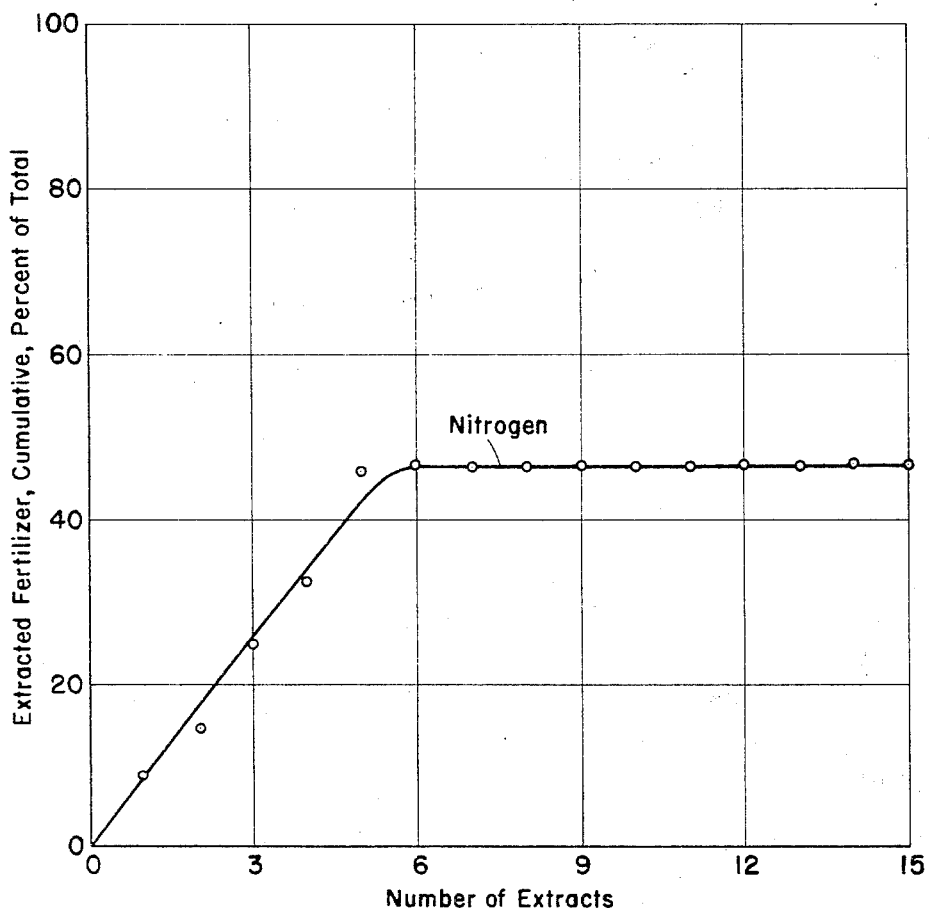

3,441,400
POROUS MINERAL CARRIER IMPREGNATED
WITH A NITROGEN FERTILIZER
Joseph V. Otrhalek, Dearborn, Mich., assignor to Wyandotte Chemicals Corporation, Wyandotte, Mich., a corporation of Michigan
Filed June 28, 1965, Ser. No. 467,653
Int. Cl. C05g *3/00;* C05c *1/00*
U.S. Cl. 71—54            8 Claims

ABSTRACT OF THE DISCLOSURE

A solid product suitable for use in growing plants consisting essentially of about 60 to 99 weight percent of (A) porous angular particles of a solid mineral carrier having a pore size ranging from about 4 to 35 angstroms, a particle size ranging from about 6 to 80 mesh, and which weigh about 30 to 45 pounds per cubic foot, consisting essentially of about 40 to 80 weight percent silica as $SiO_2$, about 2 to 30 weight percent alumina as $Al_2O_3$, about 0.5 to 15 weight percent of iron as $Fe_2O_3$, about 0.5 to 10 weight percent of lime as CaO, and about 0.5 to 10 weight percent magnesium as MgO, impregnated with about 1 to 40 weight percent of (B) a nitrogen-containing fertilizer composition.

---

This invention relates to a product suitable for use in growing plants and to a method of producing such product.

Satisfactory plant growth is largely influenced by the proper balance of air, water, sunshine and nutritional elements in the soil and an important factor is the condition of the soil. A hard, closely packed soil not only resists the penetration of plant roots but also impedes the passage of water, carrying nutritional elements or other substances through the soil. Thus, it has been found that a loosely packed soil is more favorable to plant growth than a hard packed soil and a number of products have been developed which tend to maintain the soil in the more loose or pliable condition. Such products, which apparently are not nutritional elements per se, may be termed adjuvants to plant growth. As such adjuvants various materials and minerals such as bentonite, glauconite, vermiculite and illite have been employed.

The use of a fertilizer to add minerals and the like to soil, to supply necessary or desirable nutritional elements which may be either lacking in the soil or which have been lost or extracted by continued use of the soil for plant growth, is as old as the use of manure as a fertilizer. While the organic fertilizers such as manure and guano are organic in general nature, the elements contained therein of principal plant nutritional value are generally inorganic elements and potassium, phosphorus and nitrogen appear to be the principal plant nutritional elements contained in the organic fertilizers. Thus, in more modern times, after more exact knowledge of the elements necessary or desirable to sustain plant growth had been obtained, other and principally inorganic sources of nutritional elements for plant growth have been utilized. The principal inorganic fertilizers are those known generally as potash, phosphate and nitrogen fertilizers, which have been used alone and in various combinations, usually being mixed with the soil in varying amounts in accordance with the needs of a particular soil and the crop or crops to be grown thereon. Such inorganic fertilizers normally contain other constituents, in amounts varying from small traces to small percentages, such additional elements including compounds of manganese, boron, aluminum, barium and others, as well as zinc sulphate, copper sulphate and the like. In fertilizers which contain plant nutritional elements, these elements are not contained as such but are contained as compounds. Thus, a potash fertilizer may consist generally of one or more potassium salts mixed with a filler to give a desired potash content, generally specified on the basis of $K_2O$. Such salts may be a chloride salt, such as KCl, or other salts such as $K_2SO_4$, $KNO_3$, $MgSO_4.K_2SO_4.6H_2O$, or the like. The inorganic phosphate fertilizers may be derived principally from so-called "phosphate rock," or $Ca_3(PO_4)_2$, which after a suitable acid treatment produces a so-called "super phosphate" or $CaH_4(PO_4)_2.H_2O$. The inorganic nitrogen fertilizers may include compounds such as $CaCN_2$, $NaNO_3$, $(NH_4)_2SO_4$, and other similar compounds containing nitrogen. The nitrogen, phosphate and potash fertilizers may be combined in a single mixture, which ordinarily but not necessarily contains a greater proportion of phosphate than the others. Of course, such mixtures also contain various other elements and compounds, as indicated previously. The inorganic fertilizers are usually produced in the form of water-soluble compositions, since there appears to be an action of the moisture in the soil necessary to carry adequate nutritional elements to the plant roots, as well as their being reached by the roots through the soil.

It has already been suggested in the prior art to provide a product which combines both the functions of adjuvants and the addition of nutritional elements to the soil by providing granules of materials such as bentonite, glauconite, vermiculite, illite, calcined diatomaceous earth, attapulgite, etc. and fertilizer components. Impregnation of the granules of the adjuvant with the fertilizing material has also been suggested. However, with such adjuvant materials only when the active ingredient is used in trace amounts or has a high water-solubility have impregnation techniques been feasible. Further, with the prior art adjuvants, leaching reduces the quantity of the nutrient elements held in the pores of the material. It has always been desirable to produce a fertilizer product with a maximum amount of resistance to leaching, and more specifically, greatly increased ability to release the fertilizing material and, particularly, nitrogen slowly whereby a single application or minimum number of applications of the material is required to maintain the proper feeding of the plants.

Accordingly, it is a purpose of the present invention to provide a solid product which serves both as an excellent soil adjuvant and as a nitrogen-containing product for supplying nutritional elements to the soil in which the nitrogen compound can withstand to a high degree the leaching effect of water when applied to the soil.

Applicant has determined that the above purpose and others may be achieved with a solid product which consists essentially of about 60 to 99 weight percent of (A) porous angular particles of a solid mineral carrier having a pore size ranging from about 4 to 35 angstroms, a particle size ranging from about 5 to 80 mesh, and which weigh about 30 to 45 pounds per cubic foot consisting essentially of about 40 to 80 weight percent silica as $SiO_2$, about 2 to 30 weight percent alumina as $Al_2O_3$, about 0.5 to 15 weight percent iron as $Fe_2O_3$, about 0.5 to 10 weight percent of lime as CaO, and about 0.5 to 10 weight percent magnesium as MgO, impregnated with about 1 to 40 weight percent of (B) a nitrogen-containing fertilizer composition.

The mineral carrier (A) may also contain trace amounts of other materials such as phosphorus, potassium, manganese and copper as can be determined by spectrographic analysis, and about 0.5 to 10 weight percent matter which is volatile at about 1,110° F. The material for mineral carrier (A) is generally obtained from clay-like deposits directly from the ground which are crushed and calcined at a temperature sufficient to drive off free water and molecular water but at a temperature which is below the disintegration point. It is known in the prior art that with such materials the free water and molecular water may be driven off at a temperature of about 900° F. and that disintegration takes place completely at a temperature of about 1,600° F. Thus, to avoid the possibility of disintegration, it is preferred to calcine at a maximum temperature of about 1,400° F.

The nitrogen-containing fertilizer composition (B) may be composed of the inorganic products such as the nitrogen, phosphate, and potash fertilizers well known to those skilled in the art to provide potassium, phosphorus, and nitrogen.

The particles of mineral carrier (A) are impregnated with the fertilizer composition (B) by spraying an aqueous solution of the fertilizer components onto the particles of the mineral carrier (A). A preferred process comprises tumbling the mineral carrier particles on a continuously moving surface such as that provided by the inside surface of a rotary drum-type apparatus similar to a rotary drier and spraying the tumbling particles with the aqueous nitrogen-containing fertilizer solution. The spraying is continued for a sufficient time to assure even distribution and to provide a material containing the desired percentages of the mineral carrier and the fertilizer composition (B). The pores of the mineral carrier (A) either absorb or adsorb the components of the fertilizer composition (B). Applicant has found that the specific mineral carrier (A) has a particular affinity for nitrogen and nitrogen compounds whereby the rate of leaching is reduced to a far greater extent than any known prior art materials. Thus, the product of this invention is ideal since it serves both as an adjuvant and as a material for slowly releasing fertilizer components, particularly nitrogen. The final product preferably contains from about 0.1 to 5 weight percent of nitrogen, about 0.1 to 5 weight percent phosphate as $P_2O_5$ and about 0.1 to 5 weight percent potash as $K_2O$. A preferred liquid fertilizer solution for spraying the mineral carrier is prepared by mixing from about 0.5 to 90 weight percent water, 0.5 to 90 weight percent of an aqueous 50% ammonium nitrate solution (containing 17.5% N), about 0.5 to 35 weight percent of an aqueous 75% phosphoric acid solution (containing 54.5% $P_2O_5$), and about 0.5 to 65 weight percent of an aqueous 45% potassium hydroxide solution (containing 37.5% $K_2O$).

The fertilizer solution is prepared by first adding the ammonium nitrate solution to the water, followed by addition of the phosphoric acid solution and finally the addition of the potassium hydroxide solution. The pH of this solution is preferably adjusted to a range of about 4.0 to 8.0 by adding either additional 75% phosphoric acid solution or additional 45% potassium hydroxide solution as required.

EXAMPLE

A large quantity of porous angular particles of a solid mineral carrier was tumbled inside a rotating drum. This material had a particle size ranging from about 10 to 40 mesh, a pore size ranging from about 4 to 35 angstroms, weighed about 38 pounds per cubic foot and consisted essentially of 69.9 weight percent silica as $SiO_2$, 14.5 weight percent alumina as $Al_2O_3$, 5.4 weight percent of iron as $Fe_2O_3$, 0.9 weight percent lime as CaO, 0.9 weight percent magnesium as MgO, small amounts of phosphorus, potassium, manganese, and copper as shown by spectrographic analysis and 1.0 weight percent of matter which is volatile at 1,110° F.

A master batch solution is prepared by mixing 68.7 weight percent water, 22.9 weight percent of an aqueous 50% ammonium nitrate solution (containing 17.5 weight percent N), 3.1 weight percent of an aqueous 75% phosphoric acid solution (containing 54.5 weight percent $P_2O_5$) and 5.3 weight percent of an aqueous 45% potassium hydroxide solution (containing 37.5 weight percent $K_2O$). First, the ammonium nitrate solution was added to the water, followed by addition of the phosphoric acid solution and finally the potassium hydroxide solution. The pH of this solution was adjusted to 6.4 to 6.6 by adding additional aqueous 75% phosphoric acid solution (containing 54.5 weight percent $P_2O_5$). This master batch solution was sprayed onto the mineral carrier particles tumbling in the drum for a period of six minutes. To prepare the ultimate product, 89 percent of the mineral carrier was employed with 11 percent of the master batch solution. The above prepared product was tested for nitrogen retentivity as follows:

100 grams of the product was weighed out and spread evenly onto a No. 30 filter paper in a 5-inch Buchner funnel. 100 milliliters of distilled water at room temperature was then carefully poured onto the bed of the product. The filtrate was collected and another 100 milliliters of distilled water was poured onto the bed of soil additive product after the original filtrate has stopped draining from the Buchner funnel. This was repeated 15 times and the filtrate in each instance collected in separate containers. The filtrate was then analyzed for nitrogen, phosphorus and potassium. The remaining sample in the Buthner funnel was also analyzed for nitrogen, phosphorus and potassium to determine the residual amounts left in the sample. The phosphorus and potash were leached at uniform rate to near exhaustion with the 15 leachings while 50 percent of the nitrogen remained, thus showing the superior resistance to leaching of this material with respect to nitrogen. These properties are due to the pore size and structure of the mineral carrier and this mineral carrier has been found to produce greatly superior results to those achieved with prior art mineral carriers. The results of the leaching tests with respect to nitrogen are shown in the accompanying drawing which shows the percentage of nitrogen remaining in the product after each successive leaching or extraction.

As a further test, another 100-gram sample of the product produced above is placed in 1,000 milliliters of distilled water and allowed to stand for 72 hours, after which the liquid portion is filtered off and analyzed for nitrogen, phosphorus, and potassium. The remaining sample of the product was analyzed to determine how much of the fertilizer elements were leached out in 72 hours. The results of these analyses showed that 50 percent of the nitrogen, 2 percent of the phosphate, and 6 percent of the potash remained in the product.

A batch of the above product was used as a mulch on rose plants wherein a ½-inch thick layer was applied on one large bench. This bench had been irrigated in normal fashion. The irrigation was applied regularly over a period of three months and satisfactory growth was achieved without supplementary fertilizer which was normally required at bi-weekly intervals. The plants were healthy with good foliage, firm buds and excellent root structure.

Hydrangea, azalea and poinsettia were potted in mixes of one-third of the above product and two-thirds soil. These plants grew satisfactorily for two months without supplementary feeding. The plants were healthy with deep green foliage and excellent root structure. Similar results were obtained with chrysanthemums and African violets.

What is claimed is:

1. A solid product suitable for use in growing plants consisting essentially of about 60 to 99 weight percent of
   (A) porous angular particles of a solid mineral carrier obtained from clay-like deposits directly from the ground which are crushed and calcined at a temperature greater than about 900° F. and below about 1,600° F. and having a pore size ranging from about 4 to 35 angstroms, a particle size ranging from about 6 to 80 mesh, and which weigh about 30 to 45 pounds per cubic foot, consisting essentially of about 40 to 80 weight percent silica as $SiO_2$, about 2 to 30 weight percent alumina as $Al_2O_3$, about 0.5 to 15 weight percent of iron as $Fe_2O_3$, about 0.5 to 10 weight percent of lime as CaO, and about 0.5 to 10 weight percent magnesium as MgO, impregnated with about 1 to 40 weight percent of
(B) a nitrogen-containing fertilizer composition.

2. The product of claim 1 wherein said product contains about 0.1 to 5 weight percent nitrogen, about 0.1 to 5 weight percent phosphate as $P_2O_5$, and about 0.1 to 5 weight percent potash as $K_2O$.

3. The product of claim 1 wherein said mineral carrier is impregnated by spraying said particles with a liquid fertilizer solution prepared by mixing about 0.5 to 90 weight percent water, about 0.5 to 90 weight percent of an aqueous 50 percent ammonium nitrate solution, about 0.5 to 35 weight percent of an aqueous 75 percent phosphoric acid solution and about 0.5 to 65 weight percent of an aqueous 45 percent potassium hydroxide solution.

4. The product of claim 3 wherein the pH of said fertilizer solution is from about 6.4 to 6.6.

5. A process for the manufacture of a solid product suitable for use in growing plants comprising the steps of tumbling (A) porous angular particles of a solid mineral carrier obtained from clay-like deposits directly from the ground which are crushed and calcined at a temperature greater than about 900° F. and below about 1,600° F. and having a pore size ranging from about 4 to 35 angstroms, a particle size ranging from about 6 to 80 mesh, and which weigh about 30 to 45 pounds per cubic foot, consisting essentially of about 40 to 80 weight percent silica as $SiO_2$, about 2 to 30 weight percent alumina as $Al_2O_3$, about 0.5 to 10 weight percent iron as $Fe_2O_3$, about 0.5 to 10 weight percent lime as CaO, and about 0.5 to 10 weight percent magnesium as MgO on a continuously moving surface and spraying said particles with (B) an aqueous nitrogen-containing fertilizer solution for a period of time sufficient to produce a product containing 60 to 99 weight percent of said mineral carrier (A) and 1 to 40 weight percent of said nitrogen-containing fertilizer composition (B).

6. The method of claim 5 wherein said liquid fertilizer solution is prepared by mixing about 0.5 to 90 weight percent water, about 0.5 to 90 weight percent of an aqueous 50 percent ammonium nitrate solution, about 0.5 to 35 weight percent of an aqueous 75 percent phosphoric acid solution and about 0.5 to 65 weight percent of an aqueous 45 percent potassium hydroxide solution.

7. The method of claim 6 wherein said liquid fertilizer solution is prepared by adding said ammonium nitrate solution to said water, followed by addition of said phosphoric acid solution, and then adding said potassium hydroxide solution.

8. The method of claim 7 wherein the pH of said fertilizer solution is adjusted to about 4.0 to 8.0.

References Cited

UNITED STATES PATENTS

| 3,050,385 | 8/1962  | Parker. |        |
|-----------|---------|---------|--------|
| 3,303,016 | 2/1967  | Boukidis | 71—62 |
| 3,062,637 | 11/1962 | Marples et al. | 71—64 |
| 3,218,149 | 11/1965 | Sproull et al. | 71—64 |

OTHER REFERENCES

Grim, Ralph E., Clay Minerology, McGraw-Hill Book Co., Inc., N.Y. (1953).

DONALL H. SYLVESTER, *Primary Examiner.*

T. G. FERRIS, *Assistant Examiner.*

U.S. Cl. X.R.

71—62, 64